Patented Jan. 19, 1932

1,841,430

UNITED STATES PATENT OFFICE

MARTIN BOLLMANN, OF BERLIN, GERMANY, ASSIGNOR TO WINTHROP CHEMICAL COMPANY, INC., OF NEW YORK, N. Y., A CORPORATION OF NEW YORK

ESTERS OF POLYVALENT ALCOHOLS

No Drawing. Application filed March 20, 1929, Serial No. 348,663, and in Germany November 6, 1928.

The present invention relates to the new compounds of the general formula

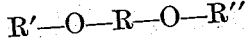

where R means an alkyl group, R' means a radicle comprising an aryl or aralkyl group and R'' means an acyl group containing at least three carbon atoms.

These derivatives of polyvalent alcohols, for instance of 1.2-dihydroxyethane, 1.3-dihydroxypropane, 1.2.3-trihydroxypropane are useful as perfumes and flavorings, as they are generally characterized by a fruity sweet odor of high permanence.

The new compounds may be made by introducing into the hydroxyl groups of polyvalent alcohols, in any order, aryl- or aralkyl groups, for example, the phenyl, a methylphenyl or the benzyl-group, and acyl-groups containing at least three carbon atoms, for example, the propionyl, butyryl, isobutyryl, benzoyl, cinnamyl-group, or by causing the corresponding esters of halogen alcohols to react with phenolates.

The following examples illustrate the process:

*Example 1.*—1 molecular proportion of 1-phenoxy-2-hydroxyethane is heated to boiling with 0.6 molecular proportion of isovaleric acid anhydride and 0.13 molecular proportion of sodium isovaleriate for 8 hours in a reflux apparatus. After cooling the product is washed until neutral and fractionated in a vacuum.

*Example 2.*—1 molecular proportion of 1-para-methylphenoxy-2-hydroxyethane and 1 molecular proportion of isobutyric acid are heated together for 8 hours while the temperature gradually rises to 205° C., whereby liberated water is distilled. The product is washed until neutral and fractionated in a vacuum.

*Example 3.*—1 molecular proportion of 1-butyryloxy-2-hydroxyethane, 1 molecular proportion of benzylchloride, 0.5 molecular proportion of calcium carbonate and 3 molecular proportions of water are mixed, and the mixture boiled for 8 hours in a reflux apparatus. After cooling, the product is washed until neutral and fractionated in a vacuum.

*Example 4.*—Equimolecular proportions of 1-butyryloxy-2-chlorethane and dry potassium phenolate are heated together for 6 hours in a reflux apparatus. After cooling, the product is washed until neutral and fractionated in a vacuum.

Among other compounds which can be made according to the invention are—

1-phenoxy-2-propionyloxy-ethane,

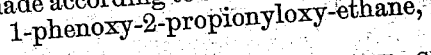

a colorless liquid, $D_{15°C.}=1.085$, $Bp._{4mm}=121°$ C. Herbaceous odor, resembling hyacinth.

1-phenoxy-2-butyryloxy-ethane,

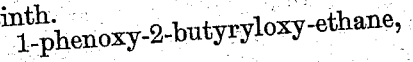

a colorless liquid, $D_{15°C.}=1.060$, $Bp._{4mm}=129–131°$ C. Fruity, sweet odor.

1-phenoxy-2-isobutyryloxy-ethane,

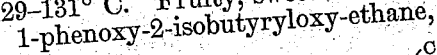

a colorless liquid, $D_{15°C.}=1.053$, $Bp._{4mm}=125–127°$ C. Fruity, sweet odor.

1-phenoxy-2-isovaleryloxy-ethane,

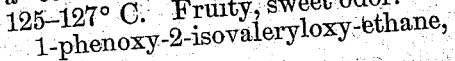

a colorless liquid, $D_{15°C.}=1,033$, $Bp._{4mm}=135–136°$ C. Fruity, sweet odor.

1-phenoxy-2-benzoyloxy-ethane,

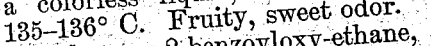

colorless crystals, melting point 64° C. Feeble odor, resembling balsam.

1-phenoxy-2-cinnamyloxy-ethane,

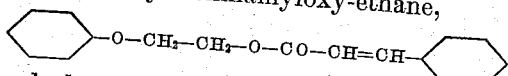

colorless crystals, melting point 64° C. Feeble herbaceous odor.

1-para-methylphenoxy-2-isobutyryloxy-ethane,

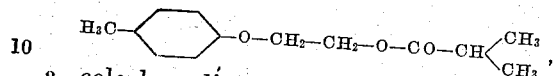

a colorless liquid, $D_{15°C.} = 1,035$, $Bp._{3mm} = 124–125°$ C. Fruity, sweet odor.

1-ortho-methylphenyloxy-2-isobutyryloxy-ethane,

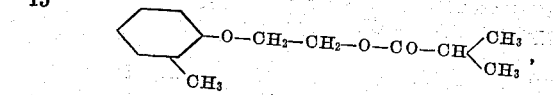

a colorless liquid, $D_{15°C.} = 1,037$, $Bp._{4mm} = 128–130°$ C. Fruity, herbaceous odor.

1-benzyloxy-2-isobutyryloxy-ethane,

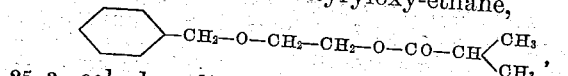

a colorless liquid, $D_{15°C.} = 1.034$, $Bp._{5mm} = 134–137°$ C. Fruity, sweet odor.

1-phenoxy-3-isobutyryloxy-propane,

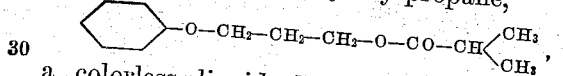

a colorless liquid, $D_{15°C.} = 1.023$, $Bp._{3mm} = 138–141°$ C. Fruity, sweet odor.

I claim:—

1. The new compounds of the general formula R′—O—R—O—R″, where R means an alkyl group, R′ means an aryl or an aralkyl group, and R″ means an acyl group containing at least three carbon atoms.

2. The new compounds of the general formula R′—O—CH₂—CH₂—O—R″, where R′ means an aryl or an aralkyl group, and R″ means an acyl group containing at least three carbon atoms.

3. The new compounds of the general formula aryl—O—R—O—R″, where R means an alkyl group and R″ means an acyl group containing at least three carbon atoms.

4. The new compounds of the general formula R′—O—R—O—R″, where R means an alkyl group, R′ means an aryl or an aralkyl group, and R″ means the isobutyryl group.

5. The new 1-phenoxy-2-isobutyryloxy-ethane

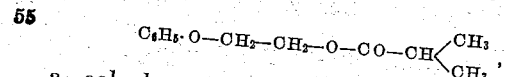

a colorless liquid, $D_{15°C.} = 1,053$, $Bp._{4mm} = 125–127°$ C. having a fruity sweet odor.

6. The new 1-para-methylphenoxy-2-isobutyryloxy-ethane having the formula

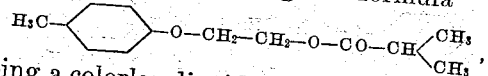

being a colorless liquid whose density is 1.035 at 15° C., which boils at 124–125° C. under a pressure of 3 mm. of mercury and which has a fruity, sweet odor.

7. The new 1-phenoxy-3-isobutyryloxy-propane having the formula.

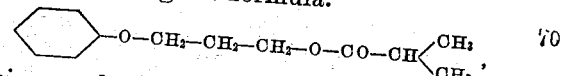

being a colorless liquid whose density is 1.023 at 15° C., which boils at 138–141° C. under a pressure of 3 mm. of mercury and which has a fruity, sweet odor.

In testimony whereof, I affix my signature.

MARTIN BOLLMANN.